(12) United States Patent
Hasunuma et al.

(10) Patent No.: US 8,174,811 B2
(45) Date of Patent: May 8, 2012

(54) OVERHEAT PROTECTION DEVICE AND ELECTRICAL SYSTEM HAVING SAME

(75) Inventors: Takashi Hasunuma, Narita (JP); Takashi Sato, Kashiwa (JP)

(73) Assignee: Tyco Electronics Japan G.K., Kawasaki-shi (JP)

( * ) Notice: Subject to any disclaimer, the term of this patent is extended or adjusted under 35 U.S.C. 154(b) by 230 days.

(21) Appl. No.: 10/578,380

(22) PCT Filed: Nov. 2, 2004

(86) PCT No.: PCT/JP2004/016257
§ 371 (c)(1),
(2), (4) Date: Jan. 22, 2007

(87) PCT Pub. No.: WO2005/046017
PCT Pub. Date: May 19, 2005

(65) Prior Publication Data
US 2007/0210893 A1   Sep. 13, 2007

(30) Foreign Application Priority Data
Nov. 7, 2003   (JP) .................... 2003-378162

(51) Int. Cl.
*H02H 5/04* (2006.01)
*H01M 2/00* (2006.01)
*H01M 10/50* (2006.01)
*H02J 7/04* (2006.01)
(52) U.S. Cl. ............ 361/106; 361/103; 429/61; 429/62; 320/150; 320/154
(58) Field of Classification Search .......... 320/150–153, 320/154; 361/93.8, 103, 106; 429/61, 62
See application file for complete search history.

(56) References Cited

U.S. PATENT DOCUMENTS

| 5,963,019 | A | 10/1999 | Cheon | |
| 6,356,424 | B1 * | 3/2002 | Myong et al. | 361/93.7 |
| 6,661,633 | B1 * | 12/2003 | Furuta et al. | 361/103 |
| 6,700,766 | B2 * | 3/2004 | Sato | 361/93.1 |
| 6,963,477 | B2 * | 11/2005 | Ikeda | 361/106 |
| 7,391,185 | B2 * | 6/2008 | Tsubaki et al. | 320/150 |
| 7,550,950 | B2 * | 6/2009 | Tsubaki et al. | 320/150 |

FOREIGN PATENT DOCUMENTS

| CN | 1318211 A | 10/2001 |
| EP | 0766362 A | 4/1997 |
| JP | 58-75439 U | 5/1983 |

(Continued)

OTHER PUBLICATIONS

International Search Report for International Application No. PCT/JP2004/016257.

(Continued)

*Primary Examiner* — Richard V Muralidar

(57) ABSTRACT

The present invention provides an overheat protection device which is capable of effectively preventing a secondary battery from overheating. In the overheat protection device (20), a variable resistive element(s) (11) of which resistance varies depending on a temperature is located on and thermally combined with a certain position(s) of an electrical system (1), and a switching element (15) for controlling a current depending on an applied voltage thereto is arranged so as to control the current flowing through the electrical system (1). When the certain position of the electrical system (1) comes to be under a high temperature condition, the variable resistive element (11) interrupts the current flowing through the electrical system (1) by changing the applied voltage to the switching element (15).

8 Claims, 2 Drawing Sheets

FOREIGN PATENT DOCUMENTS

| | | | |
|---|---|---|---|
| JP | 10-270094 | A | 10/1998 |
| JP | 11-191436 | A | 7/1999 |
| JP | 11-215716 | A | 8/1999 |
| JP | 2000-152516 | * | 5/2000 |
| JP | 2000-152516 | A | 5/2000 |
| JP | 2005-152516 | * | 5/2000 |
| JP | 2001-102039 | A | 4/2001 |
| JP | 2002-508918 | A | 3/2002 |
| JP | 2002-118957 | A | 4/2002 |
| JP | 2002-233048 | A | 8/2002 |
| JP | 2002-528874 | A | 9/2002 |

OTHER PUBLICATIONS

EP Supplementary Search Report, EP Application No. 04799460.3 (PCT/JP2004/016257), mailed Oct. 2, 2009.

* cited by examiner

PRIOR ART

OVERHEAT PROTECTION DEVICE AND ELECTRICAL SYSTEM HAVING SAME

TECHNICAL FIELD

The present invention relates to an overheat protection device for preventing an electrical system or apparatus, e.g. a secondary battery, from overheating, and more specifically to the overheat protection device using a variable resistive element such as a PTC element of which resistance varies depending on a temperature. Further, the present invention relates to the electrical system or apparatus having such overheat protection device.

The term "PTC element" means a thermistor having a Positive Temperature Coefficient, as is known in the field of the electric/electronic circuit technology. When a temperature of the PTC element is relatively low (e.g., an ordinary or room temperature), an electric resistance thereof is also low, but when the temperature of the PTC element exceeds a certain temperature (hereinafter referred to as a trip temperature), the electric resistance steeply increases. Throughout the present description, the former state of the PTC element is called "Low state," and the latter state thereof, "High state." Such temperature-dependent electric characteristics (or change in resistance) of the PTC element is reversible.

BACKGROUND OF THE INVENTION

In recent years, a PTC element is used to prevent a secondary battery from overheating which is housed in an electronic/electric instrument such as a cellular phone (see, for example, Patent Literature 1).

As an example, a block diagram of a conventional electric circuit incorporating such PTC element for overheat protection is shown in FIG. 4. As in the drawings, a secondary battery 61 housed in an electronic/electric instrument (not shown) is electrically connected to an application circuit 63 via terminals 67a and 67b in the conventional electric circuit 60. Further, a PTC element 65 is inserted between the secondary battery 61 and the application circuit in series. Such PTC element 65 is located-on and intimately attached to the secondary battery 61 in the electronic/electric instrument to detect a temperature anomaly of the secondary battery 61.

When an application circuit 63 is operated by using the secondary battery 61 as an electric source in the electric circuit 60 as above, a temperature of the secondary battery 61 may increase by heat generated by a discharge reaction in the secondary battery 61. As the temperature of the secondary battery 61 increases, a temperature of the PTC element 65 also increases. Under a normal condition, the PTC element 65 is at a temperature less than its trip temperature and in a Low state. In this case, a resistance of the PTC element 65 is sufficiently low to exert substantially no influence on the discharge of the secondary battery 61.

However, it may be assumed that the discharge reaction in the secondary battery 61 excessively proceeds to cause a temperature anomaly (abnormal heating). In this case, when the temperature of the PTC element 65 exceeds the trip temperature under thermal influence of the secondary battery 61, the PTC element 65 trips from the Low state to the High state to steeply increase its electric resistance. Consequently, a current flowing through the PTC element 65, that is, a current flowing through the secondary battery 61 is significantly restricted. In this way the PTC element 65 is able to prevent the secondary battery 61 from overheating by detecting the temperature anomaly of the secondary battery 61. When a cause of the temperature anomaly has been eliminated, the PTC element 65 returns to the Low state again in due course.

In addition to the overheat protection of the secondary battery 61 as described above, the PTC element 65 has also a function of overcurrent protection.

Under the normal current condition with no overcurrent, The PTC element 65 is in the Low state and does not exert substantially no influence on the discharge of the secondary battery 61. However, if the current flowing through the electric circuit 60 becomes too large, Joule heat is considerably generated in the PTC element 65. When the temperature of the PTC element 65 exceeds its trip temperature, the PTC element 65 trips from the Low state to the High state to steeply increase in its electric resistance, and therefore the current flowing through the secondary battery is significantly restricted. In this way the PTC element 65 is also able to prevent the overcurrent flowing through the secondary battery 61 by detecting the current anomaly.

As known in this technical field, the PTC element show a reversible temperature-dependent electric characteristics (change in resistance), so that it can be used repeatedly (or it is resettable). Therefore, in a case of using the PTC element for preventing the secondary battery from overheating and so on, there is advantageously no need to replace it with new one as it would be required in a case of a fuse.

Patent Literature 1: JP-A-2001-102039
Patent Literature 2: JP-A-2002-528874

DISCLOSURE OF THE INVENTION

Problems to be Solved by the Invention

In order to detect the temperature anomaly of the secondary battery 61 in the conventional electric circuit 60 as described above with reference to FIG. 4, the heat of the secondary battery 61 should be transferred to the PTC element 65 well. If the temperature anomaly (or abnormal heating) of the secondary battery 61 arises at a local portion which is distant from the intimate attachment portion to the PTC element 65, there exists a delay in time, i.e. time-lag, from when the temperature anomaly of the secondary battery 61 arises to when the PTC element 65 detect this fact (in other words, to when the temperature of the PTC element 65 exceeds the trip temperature). As the time-lag is larger, it becomes difficult to sufficiently solve problems caused by the temperature anomaly of the secondary battery. Thus, the time-lag is preferably as small as possible.

To shorten the time-lag, it may be conceived as an example that series-connected plural PTC elements (see, for example, Patent Literature 2) are inserted between the secondary battery 61 and the application circuit 63 in series in place of the PTC element 65 in the electric circuit 60 of FIG. 4, and these PTC elements are located on and intimately attached to plural positions of the secondary battery 61. However, as the number of PTC elements is larger, a combined resistance of the PTC elements becomes higher, so that a voltage drop due to the PTC elements can not be negligible. Thus, there arises a new problem of a decreased power efficiency of the electrical system using this circuit arrangement, since the PTC elements incorporated in the electric circuit for the purpose of the overheat protection, which is different from the original purpose of the electric circuit, consume more power at a normal temperature condition for the secondary battery, as compared with the case of the conventional circuit arrangement using one PTC element (see FIG. 4).

In order to solve the new problem, it may be conceived to use plural PTC elements having a very low resistance in the Low state. However, since such low-resistance PTC elements occupy more space than larger-resistance PTC elements, the low-resistance PTC elements are not suitable to be mounted on the secondary battery of which mounting space is limited.

The present invention is made to solve the above problems in the prior art, and the present invention aims to provide a novel overheat protection device which is able to effectively prevent an electrical system such as a secondary battery from overheating, and the electrical system including the same.

Means for Solving the Problems

According to one aspect of the present invention, there is provided a new overheat protection device comprising a variable resistive element, e.g. a PTC element, of which resistance varies depending on a temperature, wherein the device further comprises a switching element which controls a current flowing through an electrical system (comprising an electronic system) depending on an applied voltage thereto, and the variable resistive element is located on and thermally combined with a certain position of the electrical system and able to interrupt the current flowing through the electrical system by changing the applied voltage to the switching element when the certain position comes to be under a high temperature condition.

Conventionally, detection of a temperature anomaly and restriction on a current on detecting the temperature anomaly have been conducted by the variable resistive element only. In contrast to this conventional case using the variable resistive element (PTC element) alone, the overheat protection device of the present invention uses the variable resistive element in appropriate combination of the switching element. By the overheat protection device of the present invention, it is possible that the variable resistive element detects the temperature anomaly, and on detecting the temperature anomaly the variable resistive element controls the switching element by changing the applied voltage thereto so as to interrupt the current flowing through the electrical system. Thus, the variable resistive element itself doses not restrict the current flowing through the electrical system, so that it is not necessary to connect the variable resistive element in series with the electrical system. Therefore, according to the overheat protection device of the present invention, it becomes possible to effectively prevent the overheating by promptly detecting the temperature anomaly (especially, localized temperature anomaly) of the electrical system while the decrease in the power efficiency of the electrical system is maintained at a negligible degree.

Further, the overheat protection device of the present invention does not require to use a variable resistive element having a very low resistance at a normal temperature condition, and makes it possible to use a variable resistive element occupying a smaller space, and therefore it is suitable for an application in the electrical system of which mounting or packaging space is limited.

In one mode of the present invention, the variable resistive element is located in the electrical system including the secondary battery so as to be thermally combined with the secondary battery. According to this mode, it becomes possible to interrupt the current flowing through the secondary battery by detecting the temperature anomaly at the certain position of the secondary battery. Such electrical system including the secondary battery may be in the form of, for example, a so-called battery pack.

In regard to the present invention, the "variable resistive element" of which resistance varies depending on a temperature means an element of which electric resistance changes depending on a temperature environment to which the element is exposed. The variable resistive element is, for example, a PTC element and preferably a polymer PTC element. Since the PTC element is known in the field of the electric/electronic circuit technology, detailed description thereof is omitted. The polymer PTC element may be one called as a PPTC element or a PolySwitch (trademark). For example, the polymer PTC element has a structure in which a polymer layer dispersing conductive fillers therein is held between two metal electrode foils.

Further, the phrase 'the variable resistive element is "located on and thermally combined with" an object substance and/or an intended position' means that it is situated so as to be exposed to a temperature condition of the object substance/intended position. For example, the phrase means that the variable resistive element is located on at least partially in contact with, and preferably intimately attached to the object substance/intended position. According to the present invention, since the variable resistive element is located on and thermally combined with a certain position of the electrical system, it becomes possible to change the resistance of the variable resistive element depending on the temperature of the certain position of the electrical system and therefore to detect the temperature anomaly at the certain position. In an example where the PTC element is used as the variable resistive element, when the certain position comes to be under a high temperature condition by overheating and the PTC element is heated to its trip temperature or more, the PTC element trips to the High state and steeply increases its resistance.

Although it is only necessary to use at least one variable resistive element, plural variable resistive elements are preferably used while being electrically connected in series with each other. The plural variable resistive elements may be formed separately, and in this case the plural variable resistive elements can be located on and thermally combined with any of various positions of the electrical system (e.g. the secondary battery). Alternatively, a part or all of the plural variable resistive elements may be formed integrally (see, for example, Patent Literature 2). In any case, even when the electrical system has a localized temperature anomaly, the temperature anomaly can be detected promptly by using the plural/variable resistive elements, as compared with a case using one variable resistive element. In this context, it is not necessary to electrically connect all of the plural variable resistive elements in series with each other, and those skilled in the art will modify the connection depending on placement of the variable resistive elements and so on.

The variable resistive element(s) may be located on a position particularly where the overheating is likely to occur. In a case of using the plural variable resistive elements, they may be located on a surface of the electrical system, evenly. The variable resistive elements are preferably located on the surface with a ratio of at least one per 10 cm$^2$.

Also in regard to the present invention, the "switching element" which controls the current depending on the applied voltage thereto means an element which is able to control ON/OFF of the current flowing through the electrical system depending on the voltage applied to the switching element. Hereinafter, a condition in which the current flowing through the electrical system is not substantially controlled by the switching element is simply referred to as "ON," and a condition in which the current to flow through the electrical system is interrupted by the switching element so that the current does not substantially flow through the electrical system is also simply referred to as "OFF." The switching element comprises a Field-Effect Transistor, i.e. FET, and it is preferably a MOSFET. Since the FET is known as a switching element in the field of the electric/electronic circuit technology, detailed description thereof is omitted. As the FET, either an n-channel type or a p-channel type can be used arbitrarily.

In one mode of the present invention, the overheat protection device further comprises a resistor, the variable resistive element and the resistor are electrically connected in series with each other and in parallel to the electrical system, and the switching element is electrically connected in parallel to the resistor. According to such arrangement, the aim of the present invention can be achieved by the very simple arrangement without requiring a complicated control circuit.

More specifically, in case of using the FET as the switching element, a gate of the FET is electrically connected to a position between the variable resistive element and one end of the resistor, a source of the FET is electrically connected to another end of the resistor, the source and a drain of the FET are electrically connected to form a part of an electric circuit comprising the electrical system. According to such arrangement, when a voltage between the gate and the source (a gate-source voltage) of the FET is greater than a threshold value, the current flows between the source and the drain so that the current flows through the electrical system (ON), but when the gate-source voltage becomes not greater than the threshold value, the current does not substantially flow between the source and the drain so that the current flowing through the electrical system can be interrupted (OFF).

In this case, a value of the gate-source voltage is expressed as the following formula (1):

$$V_{GS} = \frac{R}{P+R} V_0 \quad (1)$$

wherein $V_{GS}$: the gate-source voltage, $V_0$: a voltage across the variable resistive element and the resistor, P: a resistance of the variable resistive element, R: a resistance of the resistor.

When one variable resistive element is used, the resistance P in the formula (1) is the resistance of this one variable resistive element itself. When "n" variable resistive elements electrically connected in series with each other are used (wherein the "n" is a natural number), the resistance P is a combined resistance of the resistances of the respective variable resistive elements $p_1, p_2, p_3, \ldots p_n$ as expressed in the following Formula (2).

$$P = p_1 + p_2 + p_3 + \ldots + p_n = \Sigma p \quad (2)$$

The resistor may be a well known resistor, and is generally a fixed resistor. Although a resistance of the fixed resistor may show a little temperature dependency, it can be considered as substantially constant. On the other hand, the resistance P of the variable resistive element changes depending on a temperature, more specifically a temperature of a position at which the variable resistive element is thermally combined with the electrical system (e.g. the secondary battery). When the variable resistive element (in case of plural variable resistive elements, all of them) is at the Low state, the resistance P is a relatively small certain value ($=P_L$). When the variable resistive element (in case of plural variable resistive elements, at least one of them) is at the High state, the resistance P is a very large value ($=P_H$). In order to control the ON/OFF of the current depending on the state of the variable resistive element, the overheat protection device of the present invention is designed such that in the former case the gate-source voltage $V_{GS}$ is larger than a certain threshold voltage $V_{th}$, and in the latter case the gate-source voltage $V_{GS}$ is not larger than the certain threshold voltage $V_{th}$.

While not limiting the present invention, but the relation between the resistance P of the variable resistive element and the resistance R of the resistor is preferably designed to satisfy $R/P_L > 10$ and $R/P_H < 1/10$.

In a preferred mode, the overheat protection device of the present invention further comprises other variable resistive element, e.g. a PTC element, of which resistance varies depending on a temperature in order to prevent overcurrent in the electrical system. The variable resistive element for overheat protection is electrically connected serially into the electric circuit incorporating the electrical system, unlike with the variable resistive element for detecting the temperature anomaly as described above.

In one mode of the present invention, the secondary battery (or a cell) used in combination of the overheat protection device of the present invention may be, for example, a nickel-hydrogen secondary battery, a nickel-cadmium secondary battery, a lithium ion secondary battery, a lithium-manganese secondary battery, a lithium polymer secondary battery, and other various secondary batteries.

The overheat protection device of the present invention can be used for preventing such secondary battery from overheating as one housed in a mobile apparatus, for example, a cellular phone, a personal digital assistance (PDA), a laptop type personal computer, a digital camera, a digital movie and so on. The overheat protection device of the present invention, however, is not limited to this, but can be used for preventing overheat of various electric/electronic components in a variety of mobile or portable electrical systems which would have a problem of accumulation of heat (or which may be limited in space).

According to other aspect of the present invention, there is also provided the electrical system comprising the overheat protection device of the present invention as described above. In one mode of the present invention, the electrical system comprises the secondary battery which is electrically connected to an electrical element to form an electric circuit, and the overheat protection device is connected in parallel to and between the secondary battery and the electrical element. The electrical element includes, for example, loads such as various application circuits operated with the secondary battery as a power supply, or an external power source such as a charger for charging the secondary battery. Such electrical system may be the mobile apparatus as exemplified above. The electrical system of the present invention, however, is not limited to this, but can be an electrical system comprising various components in addition to or in place of the secondary battery.

Effect of the Invention

According to the present invention, there is provided a novel overheat protection device which can effectively prevent an electrical system (e.g. one comprising a secondary battery) from overheating by interrupting a current flowing through the electrical system depending on a temperature of the electrical system, and the electrical system including the same. According to the overheat protection device and/or the electrical system of the present invention, unlike in the conventional case in which a PTC element only functions to detect a thermal anomaly and restrict the current flowing through the electrical system, the variable resistive element such as a PTC element functions to detect the temperature anomaly, and to control the current flowing through the electrical system with the switching element, and therefore the decrease in the power efficiency of the electrical system can be made as small as a negligible degree.

Further, when plural variable resistive elements are used in the present invention, the plural variable resistive elements can be mounted on various positions of the electrical system, and therefore the temperature anomaly of the electrical system can be detected more promptly so that this is preferable to address occurrence of a localized temperature anomaly, as compared with a case of using one variable resistive element.

DESCRIPTION OF NUMERALS

Figure 1:
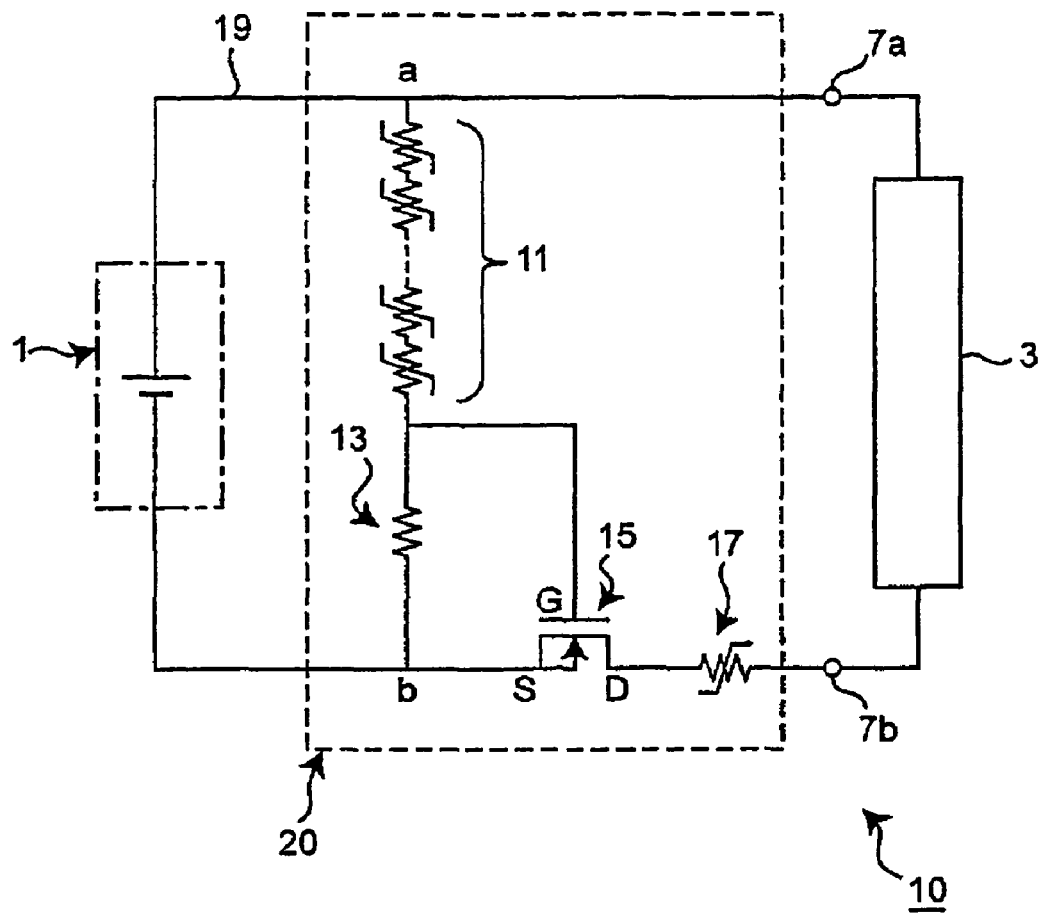
FIG. 1 shows a diagram of an electric circuit incorporating an overheat protection device in one embodiment of the present invention.

1: secondary battery
3: application circuit
7a, 7b: terminal
10: electric circuit
11: PTC element (for temperature anomaly detection)
13: resistor
15: FET
17: PTC element (for overheat protection)
19: wiring
20: overheat protection device

BEST MODES FOR CARRYING OUT THE INVENTION

An overheat protection device and an electrical system (not shown) including it in one embodiment of the present invention is hereinafter described.

FIG. 1 shows a diagram of an electric circuit 10 incorporating an overheat protection device 20 of this embodiment. In general, as shown in FIG. 1, a secondary battery 1 is electrically connected to an application circuit (en electrical element) 3 via terminals 7a and 7b with wiring 19 to form the electric circuit 10. In this electric circuit 10, the overheat protection device 20 (a part surrounded by the dotted line in the drawings) is electrically connected in parallel to and between the secondary battery 1 and the application circuit 3. The electrical system of this embodiment (not shown) is a left part with respect to the terminals 7a and 7b, which is provided with the secondary battery 1 and the overheat protection device 20 and corresponds to a so-called battery pack. The application circuit 3 is detachable from the electrical system at the terminals 7a and 7b.

In the overheat protection device 20, "n" PTC elements 11 and a resistor 13 are connected in series with each other. The resistor 13 and a FET 15 are connected in parallel to each other, while a gate (G) of the FET 15 is electrically connected to a position between the PTC elements 11 and one end of the resistor 13 and a source (S) of the FET 15 is electrically connected to another end of the resistor 13. A drain (D) of the FET 15 is electrically connected to the application circuit 3 via an optional PTC element 17, which is hereinafter described, and the source (S) and the drain (D) are arranged to form a part of an electric circuit incorporating the secondary battery 1 and the application circuit 3.

A voltage $V_O$ across the PTC elements 11 and the resistor 13 (i.e. a voltage between "a" and "b" in FIG. 1) is equal to a voltage across the secondary battery 1. A gate-source voltage $V_{GS}$ of the FET 15 is equal to a voltage across the resistor 13 and expressed as the above formula (1). A combined resistance P of the "n" PTC elements is expressed as the above formula (2).

Figure 2:
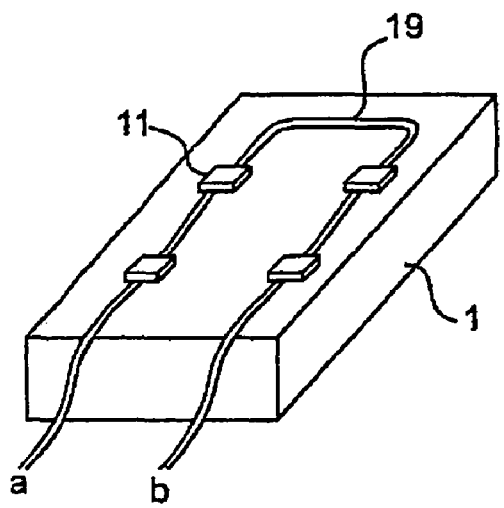
FIG. 2 illustrates a situation using the overheat protection device in the embodiment of FIG. 1 and shows a perspective view of a secondary battery on which PTC elements for temperature anomaly detection are mounted.

Any of the "n" PTC elements 11 is used to detect a temperature anomaly of the secondary battery 1. They may be located on and intimately attached to, for example, a top surface of the secondary battery 1 as shown in FIG. 2, but not limited to this and may be located on a side(s) or bottom surface thereof. In FIG. 2, locations "a" and "b" in the wiring 19 respectively correspond to positions "a" and "b" shown in the diagram of FIG. 1. It is noted that four PTC elements 11 are shown for an illustrative purpose, but less or more than four PTC elements 11 can be used.

As the secondary battery 1, for example, a nickel-cadmium secondary battery, a nickel-hydrogen secondary battery, or a lithium ion secondary battery can be used. The voltage V across the secondary battery 1 is not limited to, but may be, for example, about 0.8 V to 3.2 V. As the application circuit 3 electrically connected to such secondary battery 1, any appropriate application circuit or load can be used.

As the PTC elements 11, a PTC element having such appropriate electric characteristics is used as its trip temperature corresponds to a criterial temperature for estimating whether the secondary battery 1 is under an overheat condition or not. In an example under a condition where a voltage of about 0.2 V is applied to and a current of about 2 mA flow through each of the PTC elements 11 with a direct-current power supply, the trip temperature of the PTC elements 11 can be about 70° C. to 120° C. Under the same condition, the resistance of the PTC elements 11 in the Low state (the temperature of the element is typically about 20° C.) can be about 10Ω to 1 kΩ, and the resistance of the PTC elements 11 in the High state (the temperature of the element is typically about 100° C.) can be about 100Ω to 10 kΩ.

The number ("n") of the PTC elements 11 can be selected depending on desired temperature detecting positions of the secondary battery 1. When the plural PTC elements 11 are used (that is, the "n" is 2 or more), all or a part of them may have the same electric characteristics or different electric characteristics from each other. The PTC elements are preferably located on whole surface of the secondary battery as evenly as possible, for example, with a ratio of at least one per 10 cm². The number of the PTC elements 11 is generally from 2 to about 10, although it depends on an area of the whole surface of the electrical system.

As the resistor 13, any suitable fixed resistor may be used. The resistance R of the resistor 13 is preferably designed with respect to the resistance P ($=\Sigma p$) of the PTC element 11 to satisfy $R/P_L > 10$ and $R/P_H < 1/10$, wherein the $P_L$ is a value of the resistance P when all of the PTC elements 11 are at the Low state, and the $P_H$ is a value of the resistance P when at least one of the PTC elements 11 trips to and is at the High state.

As the FET 15, an n-channel type MOSFET is used. The threshold voltage $V_{th}$ of such FET 15 can be, for example, about 0.8 to 2.0 V, although it depends on many factors such as the voltage across the secondary battery 1, the resistance of the resistor 13, the trip temperature and the resistances at the Low state and the High state of the PTC elements 11, the number of the PTC elements 11 and so on.

In addition to the PTC elements 11 for temperature anomaly detection, the PTC element 17 for overcurrent protection may be optionally used to be electrically connected in series with and between the secondary battery 1 and the application circuit 3. The PTC element 17 is shown in FIG. 1 as locating between the application circuit 3 and the drain of the FET 15, but it is not limited to this as long as it is inserted at any position between the secondary battery 1 and the application circuit 3 in series with them. As the PTC elements 17 for overcurrent protection, a PTC element having such appropriate electric characteristics is used as its trip temperature corresponds to a criterial temperature for estimating whether the current flowing through the secondary battery 1 is overcurrent or not.

The wiring 19 for electrically connecting respective components may be a general wiring. For example, a conductive material such as copper, nickel, chromium or the like is used in any suitable form.

Hereafter, functions of the overheat protection device 20 during operation of the electric circuit 10 as above is described.

At first, when the secondary battery 1 is under a normal temperature condition, for example, the surface temperature of the secondary battery 1 is about −20° C. to 70° C., all of the PTC elements 11 are at the Low state. Thus, the resistances of the respective PTC elements 11 $p_1, p_2, p_3, \ldots, p_n$ are small, and thereby the resultant combined resistance P ($\Sigma$p) is also small. As a result, the gate-source voltage $V_{GS}$ is relatively large, e.g. about 1.5-2.0 V when the voltage V across the secondary battery is about 3 V. Such gate-source voltage $V_{GS}$ is larger than the threshold voltage $V_{th}$, e.g. about 0.8-1.2 V. Therefore, the current flows between the source (S) and the drain (D) of the FET 15, and the current flowing through the electric circuit 10 incorporating the secondary battery 1 is turned ON.

Then, as the temperature of the secondary battery 1 increases by, for example, a discharging reaction in the secondary battery 1, the temperature of the PTC elements 11 located on and intimately attached to the secondary battery 1 increases accordingly. When the secondary battery 1 is overheated to cause a temperature of at least one PTC element 11 exceeding its trip temperature, this PTC element 11 trips from the Low state to the High state to steeply increase in its resistance $p_m$ (wherein the "m" is an arbitrary natural number from 1 to "n"), and thereby the combined resistance P also steeply increases. As a result, the gate-source voltage $V_{GS}$ becomes very small, e.g. about 0.2-0.4 V when the voltage V across the secondary battery is about 3 V. Such gate-source voltage $V_{GS}$ is smaller than the threshold voltage $V_{th}$ as exemplified above. Therefore, the current does not flow between the source (S) and the drain (D) of the FET 15, and the current flowing through the electric circuit 10 incorporating the secondary battery 1 is changed to OFF.

Thereafter, as a cause of the temperature anomaly has been eliminated, that PTC element 11 in the High state returns to the Low state in due course, and the resistance $p_m$ of that PTC element 11 steeply decreases. When all of the PTC elements 11 are at the Low state and thereby the combined resistance P returns to the original small value, the current flows between the source (S) and the drain (D) of the FET 15, and the current flowing through the electric circuit 10 incorporating the secondary battery 1 is returned to ON.

In this way, it becomes possible by using the overheat protection device 20 of this embodiment to control the ON/OFF of the current flowing through the secondary battery 1 depending on the temperature of the secondary battery 1. In other words, it becomes possible by using the overheat protection device 20 of this embodiment to detect the temperature anomaly of the secondary battery by the PTC elements 11 and to interrupt the current flowing in the electric circuit incorporating the secondary battery 1 by the controlling function of the overheat protection device 20. Such interruption (OFF) of the current is conducted when at least one of the plural PTC elements detects the temperature anomaly of the secondary battery 1, and the current flows (ON) only when all of the PTC elements do not detect the temperature anomaly of the secondary battery 1. Therefore, the overheat protection of the secondary battery can be realized effectively. Thus, even when the secondary battery 1 is locally overheated, the overheating can be detected promptly, and therefore the electric circuit 10 incorporating the secondary battery can be improved in safety more than ever.

In addition to the overheat protection of the secondary battery 1 as above, the overcurrent protection is also realized by the PTC element 17.

If the current flowing through the secondary battery 1 becomes too large due to any reason such as a failure of the application circuit 3, a large amount of Joule heat is generated in the PTC element 17. When the temperature of the PTC element 17 exceeds its trip temperature, the PTC element 17 trips from the Low state to the High state to steeply increase in its resistance, and therefore the current flowing in the electric circuit incorporating the secondary battery 1 is reduced. Under this condition, the PTC element 17 is in a thermal equilibrium state and kept at the High state to protect the electric circuit. As a cause of the overcurrent has been eliminated, the temperature of the PTC element 17 becomes lower than its trip temperature in due course, the PTC element 17 returns to the Low state again to steeply increase its resistance, and thus the current of the electric circuit incorporating the secondary battery 1 returns to ON.

In this way, it becomes possible by using the PTC element 17 to prevent the overcurrent of the electric circuit 10 incorporating the secondary battery 1. It should be noted that the overheat protection device 20 of this embodiment is preferably provided with such PTC element 17 for overheat protection, but it is not necessary to conduct the present invention.

Although the overheat protection device and the electrical system in this embodiment have been described as above, this embodiment could be modified by those skilled in the art in various ways without departing the spirit of the present invention.

Figure 3:
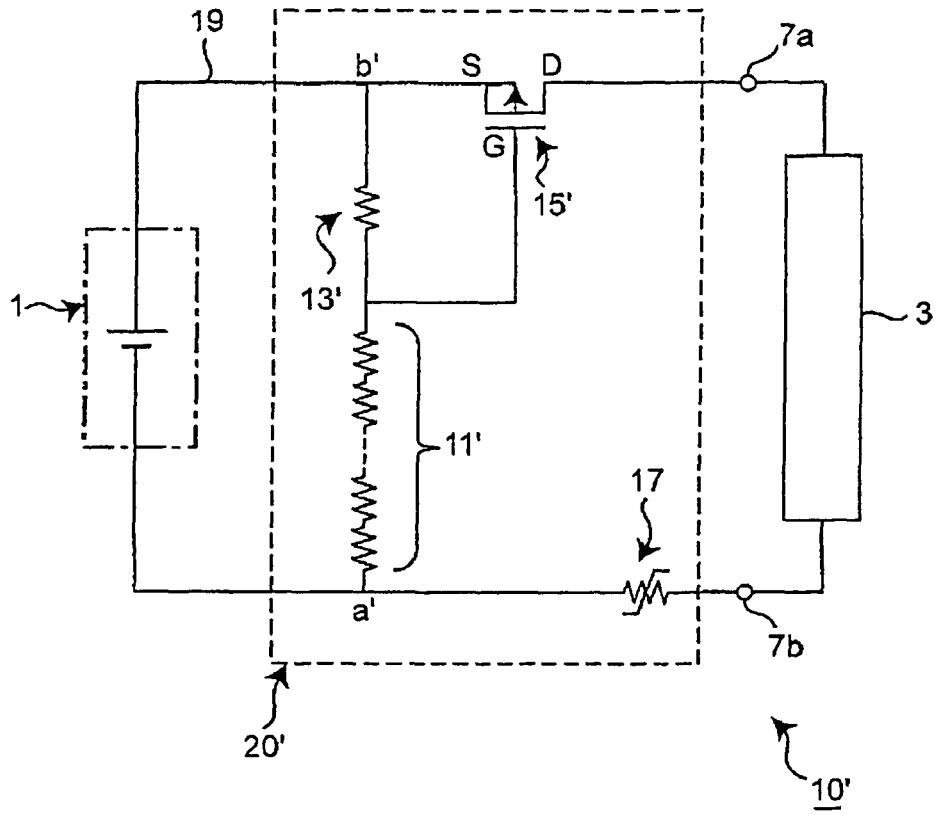
FIG. 3 shows a diagram of an electric circuit in an exemplified modification of the embodiment of FIG. 1.
Figure 4:
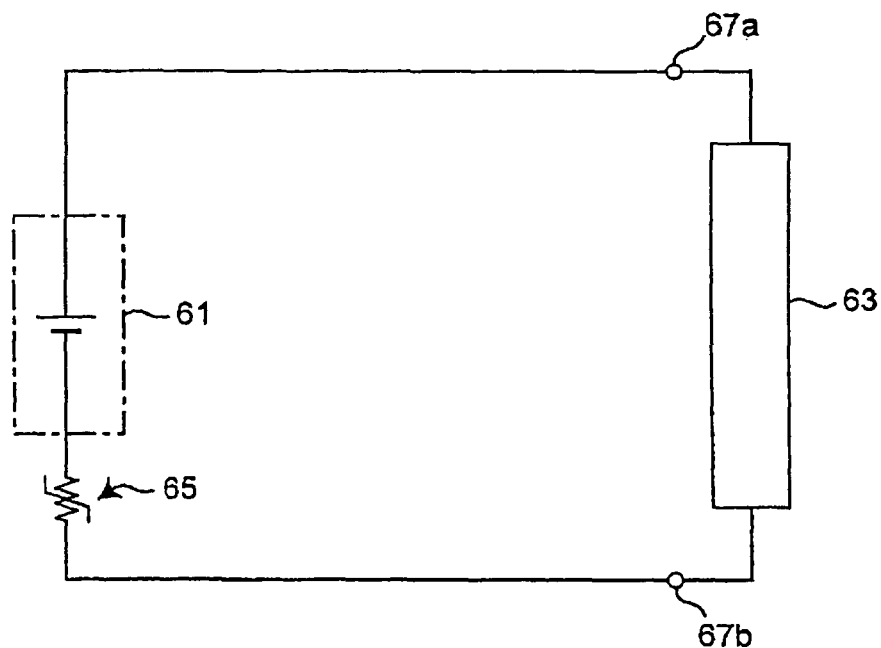
FIG. 4 shows a diagram of a conventional electric circuit incorporating a PTC element for overheat protection.

For example, although the n-channel type MOSFET is used as the switching element in this embodiment, a p-channel type MOSFET can be used. To the latter case, the electric circuit as shown in FIG. 3 can be applied. In the overheat protection device 20' shown in FIG. 3, similar components to those shown in FIG. 1 are used except that the p-channel type MOSFET 15' is used in place of the n-channel type MOSFET 15 in FIG. 1. In FIG. 3, the components are labeled with similar numerals as those of the corresponding components in FIG. 1, and detailed descriptions thereof are omitted. The overheat protection device 20' shown in FIG. 3 has similar functions as those of the overheat protection device 20 of the embodiment of FIG. 1.

Further, although the overheat protection device and the electrical system are described in this embodiment for an application to discharge of the secondary battery as an example of the present invention, it could be understood by those skilled in the art that an overheat protection device and an electrical system applied to charging can be designed based on the principle of the present invention.

INDUSTRIAL APPLICABILITY

The overheat protection device of the present invention can be preferably used for effectively preventing an electrical system such as a secondary battery from overheating.

The invention claimed is:

1. An overheat protection device comprising a variable resistive element for which resistance varies depending on temperature and which is a polymer PTC element, characterized in that the device further comprises a switching element which controls a current flowing through an electrical system depending on an applied voltage thereto, and a resistor having a resistance R, said electrical system comprising a secondary battery, and the variable resistive element is composed of a plurality of variable resistive elements at least some of which are electrically connected in series with each other, the variable resistive element being located on and thermally combined with a certain position of the electrical system and interrupts the current flowing through the electrical system by changing the applied voltage to the switching element when the certain position comes to be under a high temperature condition, the variable resistive element having a resistance in a high temperature state $P_H$ and a resistance in a low temperature state $P_L$, the relationship between the resistance of the variable resistive element and the resistor being $R/P_L > 10$ and $R/P_H < 1/10$.

2. The overheat protection device according to claim 1, wherein the variable resistive element is located on and thermally combined with the secondary battery.

3. The overheat protection device according to claim 1, wherein all of the plurality of variable resistive elements are electrically connected in series with each other.

4. The overheat protection device according to claim 1, wherein
the variable resistive element and the resistor are electrically connected in series with each other and in parallel to the electrical system, and
the switching element is electrically connected in parallel to the resistor.

5. The overheat protection device according to claim 4, wherein
the switching element is a field effect transistor (FET),
a gate of the FET is electrically connected to a position between the variable resistive element and one end of the resistor,
a source of the FET is electrically connected to another end of the resistor,
the source and a drain of the FET are electrically connected to form a part of an electric circuit comprising the electrical system, and
when a voltage between the gate and the source of the FET becomes not greater than a threshold value, the current does not substantially flow between the source and the drain of the FET so that the current flowing through the electrical system is interrupted.

6. The overheat protection device according to claim 5, wherein a value of the voltage between the gate and the source is expressed as formula (1):

$$V_{GS} = \frac{R}{P+R} V_0 \quad (1)$$

wherein $V_{GS}$ is the voltage between the gate and the source, $V_0$ is a voltage across the variable resistive element and the resistor, P is a resistance of the variable resistive element, and R is a resistance of the resistor.

7. An electrical system comprising the overheat protection device according to claim 1.

8. The electrical system according to claim 7, wherein the secondary battery is electrically connected to an electrical element to form an electric circuit, and the overheat protection device is connected in parallel to and between the secondary battery and the electrical element.

* * * * *